(12) United States Patent
Schwertfeger

(10) Patent No.: US 6,475,561 B1
(45) Date of Patent: Nov. 5, 2002

(54) METHOD OF PRODUCING SILICON TETRACHLORIDE-BASED AND ORGANICALLY MODIFIED AEROGELS

(75) Inventor: Fritz Schwertfeger, Frankfurt (DE)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/578,665

(22) Filed: May 25, 2000

Related U.S. Application Data

(63) Continuation of application No. PCT/EP98/07591, filed on Nov. 25, 1998, now abandoned.

(30) Foreign Application Priority Data

Nov. 26, 1997 (DE) .......................... 197 52 456

(51) Int. Cl.⁷ ............................ B05D 7/00; B01J 13/00; C01B 33/16
(52) U.S. Cl. ................ 427/220; 106/490; 252/62; 423/338; 428/405; 516/100; 516/101
(58) Field of Search ................ 516/100, 101; 106/490; 427/220; 428/405; 423/338; 252/62

(56) References Cited

U.S. PATENT DOCUMENTS

| | | | | |
|---|---|---|---|---|
| 3,920,865 A | * | 11/1975 | Läufer et al. | ................ 427/220 |
| 3,948,676 A | * | 4/1976 | Laüfer | .................... 106/490 X |
| 4,447,345 A | * | 5/1984 | Kummermehr et al. | ........ 252/62 |
| 5,122,291 A | * | 6/1992 | Wolff et al. | .................... 252/62 |
| 5,158,758 A | | 10/1992 | Chieng et al. | .............. 423/338 |
| 5,565,142 A | * | 10/1996 | Deshpande et al. | ..... 516/100 X |
| 5,759,506 A | * | 6/1998 | Jansen et al. | ................ 423/338 |
| 5,888,425 A | * | 3/1999 | Schwertfeger et al. | ...... 427/220 |
| 6,129,949 A | * | 10/2000 | Schwertfeger et al. | .. 516/100 X |
| 6,156,223 A | * | 12/2000 | Sigel et al. | ............. 428/405 X |
| 6,159,539 A | * | 12/2000 | Schwertfeger et al. | ...... 427/220 |

FOREIGN PATENT DOCUMENTS

| | | |
|---|---|---|
| EP | 0 149 816 | 7/1985 |
| EP | 0 653 377 | 5/1995 |
| EP | 0 658 513 | 6/1995 |
| GB | 682 574 | 11/1952 |
| GB | 2 269 377 | 9/1994 |
| WO | WO 97 17287 | 5/1997 |
| WO | WO 97 17288 | 5/1997 |
| WO | WO 97 18161 | 5/1997 |

OTHER PUBLICATIONS

*International Search Report—PCT/EP 98/07591, Apr. 19, 1999.*

* cited by examiner

*Primary Examiner*—Richard D. Lovering

(57) ABSTRACT

The present invention refers to a method of producing organically modified aerogels on a basis of silicon tetrachloride in which: a) a hydrogel is obtained by direct reaction of silicon tetrachloride with water, b) the hydrogel obtained in step a) is surface-modified, and c) the surface-modified gel obtained in step b) is dried.

20 Claims, No Drawings

METHOD OF PRODUCING SILICON TETRACHLORIDE-BASED AND ORGANICALLY MODIFIED AEROGELS

This application is a continuation of PCT/EP98/07591 filed Nov. 25, 1998, now abandoned.

The present invention relates to a method of producing silicon tetrachloride-based organically modified aerogels.

Aerogels, particularly those with above 60%/a porosity and densities below 0.6 g/cu.cm, exhibit an extremely low thermal conductivity and are therefore used as heat insulating materials, as is described for example in EP-A-0 171 122.

Aerogels in the wider sense, i.e. in the sense of "gel with air as a dispersing agent" are produced by drying a suitable gel. In this sense, the term "aerogel" embraces aerogels in the narrower sense, xerogels and kryogels. In this respect, a dried gel is termed an aerogel in the narrower sense when the fluid in the gel is eliminated at temperatures above the critical temperature and starting from pressures above critical pressure. If on the other hand the fluid of the gel is eliminated subcritically, for example with formation of a fluid-vapour interphase, then the gel produced is often referred to as a xerogel.

When the term aerogels is used in the present application, this refers to aerogels in the wider sense, i.e. in the sense of "gel with air as a dispersing agent."

In addition, aerogels can be basically sub-divided into inorganic and organic aerogels according to the nature of the gel structure. Inorganic aerogels have already been known since 1931 (S. S. Kistler, Nature 1931, 127,741). These first aerogels were produced from water glass and an acid as the starting materials. In that case, the water was exchanged for an organic solvent in the wet gels obtained and this lyogel was then super-critically dried. In this way, hydrophilic aerogels were obtained, as disclosed for example in U.S. Pat. No. 2,093,454.

Until now, various inorganic aerogels were produced. For example, $SiO_2$—, $Al_2O_3$—, $TiO_2$—, $ZrO_2$—, $SnO_2$—, $Li_2O$—, $CeO_2$— and $V_2O_5$—aerogels as well as mixtures thereof could be produced (H. D>Gesser, P. C. Goswarni, Chem Rev. 1989, 89, 765 et seq.).

Silicate based inorganic aerogels are normally produced either on a basis of water glass or acids as the raw material.

If the starting materials water then it is possible for instance, with the aid of an ion exchange resin, to produce a silicic acid aerogel which is polycondensed to an $SiO_2$ gel by the addition of a base. After exchange of the aqueous medium for a suitable organic solvent, then, in a farther step, the gel obtained is reacted with a chlorine-containing silylating medium. By virtue of their reactivity, it is likewise preferred to use methyl chlorosilanes ($Me_{4-n}SiCl_n$ in which n=1 to 3) as the silylating agents. The resulting $SiO_2$ gel modified on the source with methyl allyl groups can then be similarly dried out of an organic solvent by exposure to the air. The production method based on this technique is described in detail in EP-0-658 513.

In U.S. Pat. No. 3,015,645, the hydrogel is obtained by adding a mineral acid to a water glass solution. After formation of the hydrogel the water in the gel is exchanged for an organic solvent and subsequently allylated and sub-critically dried by means of a silylating agent, preferably a chloroalkyl silane.

The use of a chlorine-free silylating agent is described in DE-C-195 02 543. To this end, for example a silicatic lyogel produced by the method described above is presented and reacted with a chlorine-free silylating agent. The silylating agents used in this case are preferably methyl isopropene oxisilanes ($Me_{4-n}Si(OC(CH_3)CH_2)_n$ in which n=1 to 3. The resulting $SiO_2$ gel modified on the surface with methyl silyl groups can then likewise be dried out of an organic solvent by exposure to the air.

By the use of chlorine-free silylating agents, it is indeed possible to resolve the problem of HCl formation but the chlorine-free silylating agents used have a very high cost factor.

WO 95/06617 and DE-A-195 41 279 disclose methods of producing silicic acid aerogels with hydrophobic surface groups.

In WO 95/06617, the silicic acid-aerogels are obtained by reaction of a water glass solution with an acid at a pH value of 7.5 to 11, substantial liberation of the resulting silicic acid hydrogel from ionic constituents by washing with water or dilute aqueous solutions of inorganic bases, the pH value of the hydrogel being maintained in the range from 7.5 to 11, displacement of the aqueous phase contained in the hydrogel by using an alcohol and subsequent super-critical drying of the alcogel obtained.

In DE-A-195 41 279, similarly to the description in WO 95/06617, silicic acid aerogels are produced and then sub-critically dried.

In both methods, however, dispensing with chlorine-containing silylating agents only results in an aerogel with hydrophobic surface groups bonded via nitrogen. These can be split off very readily again in a hydrous atmosphere. Consequently, the aerogel described is only briefly hydrophobic.

The use of water glass as a starting material, however, has the disadvantage that by-products occur such as NaCl and the process is generally quite expensive.

If silanes are used as a raw material for silicated aerogels, then by virtue of the very difficult handling of silicon tetrachloride, from the subsequent products, tetralkyl silanes are used as the staring material.

For example, $SiO_2$ aerogels can be used by acid hydrolysis and condensation of tetra ethyl orthosilicate in ethanol. The result is a gel which by supercritical drying can be dried while retaining its structure. Production methods based on this drying technique are known for example from EP-A-0 396 076, WO 92/03378 and WO 95106617. One alternative to the above drying is a method for the subcritical drying of $SiO_2$ gels in which these are reacted with a chlorine-containing silylating agent prior to drying. In this case, the $SiO_2$ gel can be obtained for example by acid hydrolysis of tetra alkoxy silanes, preferably tetra ethoxy silane (TEOS) in a suitable organic solvent, preferably ethanol, by reaction with water. Once the solvent has been exchanged for a suitable organic solvent, in a further step, the gel obtained is reacted with a chlorine-containing silylating agent. In this respect, by virtue of their reactivity, methyl chlorosilanes ($Me_{4-n}SiCl_n$ in which n=1 to 3) are preferably used as silylating agents. The resulting $SiO_2$ gel modified on the surface with methyl silyl groups can then be air dried out of an organic solvent. Thus, aerogels with densities below 0.4 g/cc and parasites above 60° C. can be achieved. The production method based on this drying technique is described in detail in WO 94/25149.

The above-described gels can, furthermore, prior to drying in alcoholic solution which contains the quart of water needed for reaction, be mixed with tetra alkoxy silanes and aged in order to enhance the gel network strength, as disclosed for example in WO 92120623.

The tetra alkoxy silanes used in the above-described methods as starting materials can however constitute an extremely high cost factor.

Therefore, it will be substantially more favourable to use silicon tetrachloride as a starting material.

Furthermore, common to all the methods of producing aerogels with a density of less than 300 kg/cu.m which are known from the state of the art is that prior to drying, the water is exchanged for an organic solvent or $CO_2$. In the case of supercritical drying, the water from the pores of the hydrogel is previously exchanged for an organic solvent so that in the supercritical state, the water does not partially or completely dissolve the network. With regard to production by subcritical drying, prior to the necessary surface modification, there is likewise an exchange of the water in the hydrogel for an organic solvent. This was and is, in the opinion of the experts in the field, needed since for instance in the case of silylating agents, either the silylating agents do not dissolve in water and cannot therefore be incorporated into the gel via the aqueous phase in which the gel particles are normally to be found, or the silylating agents react in water with the same or with themselves so that they are no longer available for silylating the gel or their reactivity is greatly diminished.

As in the case of aerogel production, also when organically modified wet gels are being produced, it is the opinion of the experts that an exchange of water in the gel pores for some other solvent is necessary.

Exchange of water for another solvent is however in any case both time, energy and cost intensive. Furthermore, there are considerable problems with regard to safety.

Therefore, the object on which the present invention is based was to provide a method of producing organically modified silicate-based aerogels in which the starting material is silicon tetrachloride and an everyday medium is used for surface modification and it is possible to dispense with an exchange of the solvent in the water for some other solvent.

Surprisingly, this problem is resolved by a method of producing organically modified silicate-based aerogels in which a) a hydrogel is obtained by direct reaction of silicon tetrachloride with water, b) the hydrogel obtained in step a) is surface modified, and c) the surface-modified gel obtained in step b) is dried.

Preferably, the hydrogel obtained is surface silylated in step b).

In a first preferred embodiment, disiloxanes to formula I and/or disilazanes to formula II are used as silylating agents

in which the radicals R, independently of each other, identically or differently, each denote a hydrogen atom or a non-reactive organic linear branched cyclic saturated or unsaturated aromatic or heteroaromatic radical.

In a second preferred embodiment, the silylating agents used are silanes to formula $R^1_{4-n}SiCl_n$ or $R^1_{4-n}Si(OR^2)_n$ in which n=1 to 4, in which $R^1$ and $R^2$ independently of each other, identically or differently, each represent a hydrogen atom or a non-reactive organic linear branched cyclic saturated or unsaturated aromatic or heteroaromatic radical.

In the present application, the term hydrogel is understood to mean a gel which is dispersed in at least one solvent, the liquid phase containing at least 50% by weight and preferably at least 80% by weight and particularly preferably at least 90% by weight and in particular at least 98% by weight water.

In step b), the agent is directly offered as a reactant without any prior exchange of the water contained in the pores for an organic solvent or $CO_2$.

The network of the hydrogel is present as a basic silicatic composition. It can furthermore contain fractions of zircon aluminium, titanium, vanadium and/or ferrous compounds. A purely silicate-based hydrogel is preferred. The various components do not necessarily have to be homogeneously distributed and/or form a continuous network. It is also possible for individual components to be entirely or partly present in the form of inclusions, single grains and/or deposits in the network.

A preferred embodiment for the production of hydrogels is described hereinafter without this however qualifying the invention.

In step a), a silicated hydrogel is provided which is obtained by hydrolysis and poly-condensation of silicon tetrachloride ($SiCl_4$) with water. The hydrolysis and poly-condensation can thereby take place both in one step or also in several steps.

Preferably, hydrolysis and polycondensation take place in one step.

The silicon tetrachloride can thereby be used in concentrated form or also diluted. In principle, any liquids or solvents which are miscible with silicon tetrachloride are suitable for dilution. Preferred are aliphatic or aromatic hydrocarbons, aliphatic alcohols, ethers, esters or ketones and also water. Particularly preferred solvents are methanol, ethanol, i-propanol, acetone, tetrahydrofurane, pentane, n-hexane, n-heptane, toluene and water. Quite particularly preferred is acetone, pentane, n-hexane, n-heptane and water. However, it is also possible to use mixtures of the said solvents.

Furthermore, also the water required for hydrolysis-polycondensation can be mixed with miscible solvents. Suitable solvents are likewise those described above.

Furthermore, acids or bases may be added to the water. Preferred acids for this purpose are sulphuric, phosphoric, hydrofluoric, oxalic, acetic, formic and/or hydrochloric acid. Particularly preferred are hydrochloric acid and acetic acid. Hydrochloric acid is quite particularly preferred. However, it is also possible to use mixtures of the corresponding acids. Generally, $NH_4OH$, NaOH, <OH and/or $Al(OH)_3$ are used as bases. Caustic soda solution is preferred.

Furthermore, the above-mentioned acids or bases can be partly or even entirely added to the reaction mixture during the hydrolysis/polycondensation reaction.

The hydrogel produced preferably from the above-described silicon tetrachloride can additionally contain, to enable condensation, zirconium, aluminium, tin and/or titanium compounds. In this respect, prior to or during hydrolysis/polycondensation reaction, these compounds can be added to the above-described starting compounds and/or they can be added to the gel after the gel has been formed.

Furthermore, in order to and/or during gel production, opacifiers, particularly IR opacifiers, can be used as additives in order to reduce radiation's contribution to heat conductivity such as for example soot, titanium oxide, ferrous oxide and/or zirconium oxide.

Furthermore, in order to enhance the mechanical stability of the gel, fibres may be added to the starting materials. Suitable fibre materials are inorganic fibres such as for example glass fibres or mineral fibres, organic fibres such as for example polyester fibres, aramide fibres, nylon fibres or fibres of vegetable origin as well as mixtures thereof. The fibres can also be coated such as for example polyester fibres metallised with a metal such as for example aluminium.

Generally, the hydrogel is produced at a temperature between freezing point and the boiling point of the reactants. Preferably a temperature between 0° C. and 50° C. is used and particularly preferred is a temperature between 0° C. and 30° C. If need be, a shaping stage such as for example spray forming, extrusion or drop forming may be carried out at the same time.

The hydrogel obtained can furthermore be subjected to ageing. Generally, ageing is carried out at a temperature in the range from 20 to 100° C., preferably 40 to 100° C. The tune required generally amounts to 48 hours and preferably up to 24 hours and is particularly up to 3 hours.

This ageing can take place poor to and/or after a possible washing of the hydrogel. Where this is concerned, the hydrogel can be washed with the above-described solvents in order thereby to alter the pH value in the pores of the hydrogel, for instance. Washing with water is preferred.

If, prior to stage b), less than 50% by weight of water is in the pores of the hydrogel, then by means of washing, the water content of the pores can be increased at least to 50% by weight of water.

In step b), the hydrogel obtained from step a) is surface-modified, being preferably surface-silylated. The invention will be described in greater detail hereinafter with reference to surface silylation but without being restricted thereto.

In principle, the silylating agent can be present in any aggregate state, preferably however in liquid form and/or as a gas or vapour.

If the silylating agent is used as a gas and/or as a vapour, the temperature of the aqueous a hydrogel is preferably between 20 and 100° C. and particularly preferably between 40 and 100 C. and in particular between 60 and 100° C. Even higher temperatures under pressure are possible, so that boiling of the water in the capillaries of the gel is avoided.

If this silylating agent is used as a liquid, the temperature of the aqueous hydrogel is preferably between 20 and 100° C. Higher temperatures under pressure are possible to avoid the water boiling in the capillaries of the gel.

If the silylating agent is used as a gas and/or vapour, then it may be present during the reaction in a gas stream or in a stationary gas atmosphere.

The temperature of the silylating agent(s) in the gas phase can also be elevated by pressure or by an additional gas flow.

In a preferred embodiment, the silylating agent can also be present in liquid phase. In this case, it can be used directly as a liquid phase and/or form on the surface of the hydrogel by condensation of the gas used. Then, the temperature of the liquid phase can be between 0° C. and the boiling point of the silylating agent(s). Preferred temperatures are between 20 and 100° C. If necessary, it is also possible to work at higher temperatures under pressure. Generally, surface silylation is accelerated at elevated temperatures.

According to a preferred embodiment, disiloxanes to formula I and/or disilazanes to formula II are used as silylating agents,

$$R_3Si\text{—}O\text{—}SiR_3 \quad (I)$$

$$R_3Si\text{—}N(H)\text{—}SiR_3 \quad (II)$$

in which the radicals R, independently of each other, identically or different, respectively denote a hydrogen atom or a non-reactive organic linear branched cyclic saturated or unsaturated aromatic or heteroaromatic radical, preferably $C_1$ to $C_{18}$-alkyl or $C_6$–$C_{14}$-aryl, particularly preferably $C_6$-alkyl, cyclohexyl or phenyl, and in particular methyl or ethyl.

Preferably, the hydrogel in step b) is reacted with a symmetrical disiloxane, the term symmetrical disiloxane meaning a disiloxane in which both Si-atoms have the same R-radicals.

It is particularly preferred to use disiloxanes in which all R-radicals are the same. In particular, hexamethyl disiloxane is used.

Furthermore, any silylating agents known to a man skilled in the art and which are not miscible with water, may be used.

If the silylating agents are substantially or entirely water insoluble such as for example hexamethyl disiloxane (HMDSO), then they are easily separated from the aqueous phase which is created by the water in and out of the gel. This allows simple recycling of excess reagent. Consequently, for instance, by using concentrations in excess, it is possible to minimise silylation times.

The silylating agents needed for the actual silylation reaction can also be generated from other substances, preferably other silylating means. This can be carried out shortly prior to and/or during silylation. Furthermore, it can also take place directly before and/or during the reaction on the inner surface of the hydrogel. Here, too, the term silylating agent is understood to mean a mixture of substances which are needed for the actual silylation or which are in principle in a chemical equilibrium with one another. For instance, the mixture may contain an acid or a base which acts as a catalyst.

Preferred acids for the purpose are sulphuric, phosphoric, hydrofluoric, oxalic, acetic, formic and/or hydrochloric acid. Particularly preferred is hydrochloric acid and acetic acid. Quite particularly preferred is hydrochloric acid. Mixtures of the corresponding acids may also be used. Preferably used bases are $NH_4OH$, $NaOH$, $KOH$ and/or $Al(OH)_3$, while particular preference goes to caustic soda solution. The acids or bases can be added before, during and/or after the addition of the silylating agent(s).

The surface-silylation in step b) takes place in the presence of an acid or abase in the hydrogel and/or with at least one silylating agent, whereby in this case, too, the above-mentioned acids and bases are preferred.

In this regard, the silylating agents can be vaporised together with the acids or bases and/or brought together in the gaseous phase and/or mixed in the liquid phase. A reaction of the silylating agents with the acids or bases before and/or during vaporisation and/or in the gaseous phase and/or in the liquid phase is likewise possible. It is however also possible to dissolve the acids or bases in the water of the hydrogel.

The acid or base can be presented in the aqueous gel by means of any method known to a man skilled in the art. Preferred in this case is washing with aqueous solutions of the acids or bases or treatment by means of gaseous acids or bases. It is particularly preferred for the acids or bases to be present as highly concentrated aqueous solutions or to be gaseous, particularly in the form of gases.

The concentrations present in the water of the wet gels are generally in the range between 5% by weight and the maximum possible concentration preferably in the range between 10% by weight and the maximum possible concentration. In the case of hydrochloric acid, the concentrations are greater than 5% by weight, preferably greater than 10% by weight and particularly preferably greater than 15% by weight.

Generally, sure modification is accelerated at relatively high concentrations of acids or bases.

In this respect, it is possible that the reaction of the silylating agent(s) with the acid or base in and/or outside the hydrogel results in formation of a compound which can in turn react with the inner surface of the gel, possibly even with an accelerating or autocatalysing effect.

This will be explained briefly by taking hexamethyl disiloxane as an example, without this in any way restricting the invention.

The water-insoluble hexamethyl disiloxane can react both with the inner surface of the wet gels and also for example with HCl in the water in the pores of the hydrogel. Upon the reaction with HCl, trimethyl chlorosilane and water result. The trimethyl chlorosilane obtained is, then, water soluble, is able to diffuse into the water phase and react with the inner surface of the hydrogel and/or with the water in the pores. This increases the concentration of reactive molecules in the water phase and the inner surface situated in the interior of the pores can be more rapidly reached by the silylating agent.

According to a further preferred embodiment, silanes to the formulae $R^1_{4-n}SiCl_n$ or $R^1_{4-n}Si(OR^2)_n$ in which n=1 to 4 and preferably n=1 to 3, are used as silylating agents, $R^1$ and $R^2$, independently of each other, identically or differently, each denoting a hydrogen atom or a non-reactive organic linear branched cyclic saturated or unsaturated aromatic or heteroaromatic radical preferably $C_1$ to $C_{18}$-alkyl or $C_6$–$C_{14}$-aryl, particularly preferably $C_1$–$C_6$-aryl, cyclohexyl or phenyl, in particular methyl or ethyl. Preferably, trimethyl chlorocyclane is used. Also isopropene oxysilanes as well as silazanes are suitable.

The silylating agents needed for the actual silylation reaction can also be generated from other substances, preferably other silylating agents. This can take place shortly before and/or during silylation. Furthermore, this can also take place just immediately prior to and/or during the reaction on the inner surface of the hydrogel. The term silylating agent here, too, denotes a mixture of substances which are needed for the actual silylation or which are in principle in a chemical equilibrium with one another. For example, the mixture may contain an acid or base acting as a catalyst.

Preferred acids for this are sulphuric, phosphoric, hydrofluoric, oxalic, acetic, formic and/or hydrochloric acid. Hydrochloric acid and acetic acid are particularly preferred. Quite particularly preferred is hydrochloric acid. However, mixtures of the appropriate acids may also be used. Generally the bases used are $NH_4OH$, $NaOH$, $KOH$ and/or $Al(OH)_3$, caustic soda solution being preferred. The acids or bases can be added prior to, during and/or after the addition of the silylating agent(s). In this respect, the silylating agents can be evaporated together with the acids or bases and/or brought together in the gaseous phase and/or mixed in the liquid phase. A reaction of the silylating agents with the acids or bases prior to and/or during evaporation and/or in the gaseous phase and/or in the liquid phase is likewise possible. It is however also possible to dissolve the acids or bases in the water of the hydrogel.

Furthermore, silylation can possibly be accelerated or catalysed by means of special substances or catalysts, for example by means of at least one acid or base present in the aqueous gel. Preferably those likewise mentioned hereinabove as preferred are the preferred acids or bases. The acid or base can thereby be made available in the aqueous gel by any method known to a man skilled in the art. Preferred in this respect is washing with aqueous solutions of the acids or bases or a treatment by means of gaseous acids or bases. It is particularly preferably for the acids or bases to be present as highly concentrated aqueous solutions or to be in gaseous form, particularly as gases.

The concentrations present in the water of the wet gels are generally in the range between 0% by weight and 100% by weight, in the case of acids or bases between 0% by weight and the maximum possible concentration. In the case of hydrochloric acid, the concentrations are greater than 1% by weight and preferably greater than 5% by weight. Particularly preferred are concentrations greater than 10I/0 by weight while those greater than 15% by weight are especially preferred.

Furthermore, it is possible that by the reaction of the silylating agent or agents with the inner surface of the gel and/or the water in the gel a compound is formed such as for example an acid or base which accelerates or autocatalyses the further reaction of the silylating agent(s).

Taking trimethyl chlorosilane as an example, this will be explained briefly without however restricting the invention.

Trimethyl chlorosilane can react both with the inner surface of the wet gels and also with the water in the pores of the wet gels. In the case of the reaction with the inner surface, a by-product is HCl. During the reaction with water, hexamethyl disiloxane and HCl are produced. The resulting HCl which is dissociated in the remaining water can then accelerate the further reaction with the inner surface and in addition result in hexamethyl disiloxane which is formed to split off again to produce trimethyl chlorosilane. This increases the concentration of reactive molecules.

If the silylating agents used in the reaction with the inner surface of the gels results in splitting off anions which lead to the formation of acids or bases, then this results in an increase in the acid or base concentration in the wet gel.

Furthermore, drying of the outer surface of the wet gel particles before the actual silylation is possible. This can take place according to any drying method known to a man skilled in the art, preferably at temperatures of −30 to 200° C., particularly preferably 0 to 200° C. and preferably from 0.001 to 20 bars particularly preferred are pressures of 0.01 to 5 bars and in particular 0.1 to 2 bars, for example by radiant, convected and/or contact drying. Drying of the outer surface by means of at least one gas is preferred. In this respect, the chemically inert gases are preferred. Particularly preferred are nitrogen and argon and in particular nitrogen.

Furthermore, this drying can also take place with at least one gas which, by adsorption or reaction with the water in the pores, leads to a change in the pH value in the pores of the wet gel, such as for example hydrochloric acid or ammonia. Preferred here are gases which lead to pH values below 7. HCl gas is particularly preferred. However, mixtures with chemically inert gases can also be used.

If the wet gel becomes heated in the process, then this can lead to boiling in the pores. This can be avoided if necessary by suitable measures such as for example cooling or by higher pressure.

With regard to the use of for instance HCl gas, there is a shrinkage of the wet gel in the range from 0 to 40% by volume, preferably 0 to 30% by volume and particularly preferably from 5 to 20% by volume. As a result, the quantity of water or organic substances in the pores prior to and/or during and/or after silylation and/or prior to subsequent drying is reduced in relation to the starting quantity, which results in a reduction in the quantity of substances to be used before and/or during and/or after silylation and, during subsequent drying, this leads to a reduction in the solvent to be evaporated out of the pores, resulting in a marked reduction in outlay, for example in terms of appliance size and energy.

The outer surface of the wet gel particles can furthermore be dried also by displacement of the water by means of a substantially water insoluble silylating agent such as for example hexamethyl disiloxane (HMDSO).

In addition to the silylating agent, it is also possible to use at least one carrier gas or carrier gas flow. Clinically inert gases are used. Particularly preferred are nitrogen and argon, especially nitrogen. The temperatures of the carrier gas are generally between 20 and 400° C.

Silylation is continued until such time as the desired degree of occupancy of the inner surface of the hydrogel is achieved. However, at most just all chemically attainable surface groups can be modified.

Furthermore, by the choice of the parameters such as temperatures in and around the gel, temperature, concentration and nature of the silylating agent(s) and the flow velocity and possibly the temperature and flow velocity of the carrier gas(s), the degree of exchange of water in the pores for the silylating agent(s) as well as the degree of drying can be adjusted during silylation.

Longer silylation can achieve a complete or partial exchange of water for the silylating agent(s) in the pores of the gel.

If silylation is for example carried out in such a way that part of the water in the pores of the hydrogel reacts with the silylating agent used (e.g. trimethyl chlorosilane) to produce a water insoluble compound (e.g. hexamethyl disiloxane), then if necessary at least a part of the water is displaced from the pores by the molecular volume of the compound formed.

During silylation of the inner surface of the network, this leads to a partial or complete exchange of the liquid in the pores of the hydrogel for a water insoluble medium. These water insoluble media can easily be separated off prior to the aqueous phase which is produced by the water in and out of the gel. This makes for simple recycling of excess reagents. Consequently, for example by the use of concentrations in excess, it becomes possible to minimise silylation times.

The substances formed by the reaction of the water in the hydrogel with the silylating agent(s) can if necessary be easily recycled to produce one or more silylating agents. This will be explained briefly by taking TMCS as an example of the silylating agent.

TMCS reacts with the water in the hydrogel and forms HMDSO and HCl. After separation under suitable conditions, HMDSO and HCl can react again to produce TMCS and water.

The advantage is a reduction in the residues which arise in the present process.

Prior to step c), the silylated gel can if necessary be washed also with a protic or aprotic solvent until non-reacted silylating agent is substantially eliminated (residual content ≦0.1% by weight) and the water content of the gas is preferably <5% by weight, particularly preferably <3% by weight and especially <1% by weight. Generally, aliphatic alcohols, ether, ester or ketones as well as aliphatic or aromatic hydrocarbons are used as solvents. Preferred solvents are methanol, ethanol, acetone, tetrahydrofuorane, acetic acid ethy ester, dioxane, pentane, n-hexane, n-heptane and toluene. However, it is also possible to use mixtures of the said solvents.

Furthermore, the gel can be washed with the silylating agents used. Preferred here is trimethyl chlorosilane, trim-ethyl siloxane, hexamethyl disiloxane and hexamethyl disiloxane. Hexamethyl disiloxane is particularly preferred. However, also mixtures of the said silylating agents may be used.

Basically, for the subsequent preferably subcritical drying, it is favourable for the pores of the gas wholly or partly to contain solvents or mixtures of solvents which have a low surface tension. Hexamethyl disiloxane is preferred.

In step c), the silylated and if necessary washed gel is preferably subcritically dried, preferably at temperatures of −13 to 200° C., the particularly preferred temperature being 0 to 15° C., and pressures preferably of 0.001 to 20 bars, particularly preferably 0.01 to 5 bars and especially 0.1 to 2 bars, for example by radiant, convection and/or contact drying. Drying is preferably continued until such time as the gel has a residual solvent content of less than 0.1% by weight. The aerogels obtained by drying are each, according to the degree of modification, wholly or partly hydrophobic. The hydrophobicity is enduring.

The gel obtained in step b) can also be supercritically dried. Accordingly, this requires the respective solvent to be at temperatures higher than 200° C. and/or pressures greater than 20 bars. This is readily possible but involves increased costs.

In a further embodiment, according to its use, so the gel in step b) can be subjected to network reinforcement also. This can be achieved by reacting the gel obtained with a solution of a condensable orthosilicate to formula $R^1_{4-n}Si(OR^2)_n$, preferably an alkyl or aryl orthosilicate, n=2 to 4 and $R^1$ and $R^2$ independently of each other being hydrogen atoms, linear or branched $C_1$–$C_6$-alkyl, cyclohexyl or phenyl radicals, or with an aqueous silicic acid solution.

In a further embodiment, the gel can, following the shaping polycondensation and/or any subsequent procedural step, be reduced by any technique such as for example grinding, known to a man skilled in the art.

The aerogels produced in accordance with the methods of the invention are described above are completely or partly hydrophobic, according to the degree of modification. The hydrophobicity is lasting. The aerogels obtained, according to the method employed, carry on their inner surface only Si—R and/or Si—OH groups but no Si—OH groups.

According to the method used, so the hydrogels described above have Si—OH groups on their surface. As a result of the particularly preferred organic modification according to the invention, by means of trialkyl chlorosilanes and/or hexalkyl disiloxanes, so there is a complete or partial reaction of the Si—OH groups on the inner surface to produce Si—O—Si(R)$_3$ groups. Since, during the entire process, in contrast to the state of the art, the wet gel does not come in contact with reactive solvents such as for example alcohols (methanol, ethanol, isopropanol, etc.), ketones (acetone, etc.), ethers (dimethoxy ethers, etc.), or tetrahydrofuorane, formation of Si—OR groups on the inner surface of the gases is not possible.

The presence or organic solvents during the actual silylation leads to a deposition or organic solvents on the reactable OH groups of the gel. This prevents a possible complete reaction of the OH groups with the respective silylating agent.

If, as in the present invention, the use of organic solvents is dispensed with completely, then all the Si—OH groups which are spatially attainable for the silylating agent used are able to react with the silylating agent. Consequently, it is possible to achieve a very high degree of occupancy of the inner surface which is close to the theoretically possible degree of occupancy. This can likewise be assisted in that the methods of silylation described here make it possible, in contrast to the state of the art, to present considerable excess of reactive silylation agents in the pores of the hydrogel. Consequently, the equilibrium of the silylating agents can be shifted entirely to the side of the modified surface.

The method of producing aerogels in accordance with the invention is described in greater detail hereinafter with reference to examples of embodiment but without being restricted thereby.

EXAMPLE 1

641 g (35.6 mol) of water cooled to 70° C. are slowly mixed dropwise with 135 g (0.8 mol, 91.2 ml) silicon tetrachloride (SiCl$_4$) (cooled to 7° C.). The wet gel which forms in this process, accompanied by the development of heat, has a calculated concentration of 6.1% by weight SiO$_2$.

In experiments 1, 2 and 3, the gel is aged at 50° C. for 30 minutes and for 2 hours in experiment 4.

For silylation, 100 g hydrogel are suspended in 100 ml hexamethyl disiloxane (HMDSO) and mixed with 52.5 g (0.5 mol, 70 ml) trimethyl chlorosilane. In a few minutes, an aqueous phase forms under the HMDSO phase. After 30 minutes, the hydrophobic HMDSO moist gel is withdrawn from the HMDSO phase and dried. Drying takes place in a stream of hot nitrogen (1500 l/h, 200° C.) for one hour.
Result:

|  | Experiment 1 | Experiment 2 | Experiment 3 | Experiment 4 |
|---|---|---|---|---|
| Density/ specific gravity [kg/cu.m] | 152 | 130 | 288 | 152 |
| C content [% by weight] | 11.7 | 11.0 | 11.7 | 11.0 |
| BET surface [cu.m/g] | 684 | 606 | 695 | 630 |
| Heat conductivity [mW/mK] | — | — | — | 13.2 |

The measured BET values were determined by a BET meter ASAP 2010 from Messrs. Micromeritics using the Multipoint BET measurement method to DIN 66131. The specimen quantity used was approx 0.2 g aerogel. To prepare the specimen, the aerogels were degassed at 110° C. for at least 17 hours under a vacuum ($10^{-2}$ to $10^{-3}$ mbars). Measurement was conducted at 77° Kelvin, the temperature of liquid nitrogen. The specific surface area was determined from five measurement points within the relative pressure range (P/P$_o$) from 0.05 to 0.25 of the adsorption isotherms. In this, 0.162 cu.nm was assumed as the space required for an N$_2$ molecule. The measurement points were recorded at relative pressures of 0.05; 0.1, 0.15; 0.2 and 0.25 when the pressure fluctuations in the equilibrium pressure amounted to a maximum ±2%.

The heat conductivity levels were measured with a hot wire method (see for example O. Nielsson, G. Rüschenpöhler, J. Gross, J. Fricke, High Temperatures—High Pressures, Vol. 21, 267–274 (1989).

What is claimed is:

1. A method of producing organically modified aerogels in which:
    a) a hydrogel is obtained by direct reaction of silicon tetrachloride with water,
    b) the hydrogel in step a) is surface-modified, and
    c) the surface-modified gel obtained in step b) is dried, wherein the hydrogel obtained is surface-silylated in step b).

2. A method according to claim 1, characterised in that opacifiers are added prior to and/or during gel production.

3. A method according to claim 1, wherein fibres are added prior to and/or during gel production.

4. A method according to claim 1, wherein the hydrogel obtained in step a) is allowed to age before it is surface-modified in step b).

5. A method according to claim 1, characterised in that the silylating medium is used in liquid form and/or as a gas or vapour.

6. A method according to claim 1, wherein at least one silane of the formulae $R^1_{4-n}SiCl_n$ or $R^1_{4-n}Si(OR^2)_n$ in which n=1 to 4 is used as the silylating medium, $R^1$ and $R^2$, independently of each other, signify identically or differently, in each case a hydrogen atom or a non-reactive organic linear branched cyclic saturated or unsaturated aromatic or heteroaromatic radical.

7. A method according to claim 6, characterised in that trimethyl chlorosilane is used as the silylating agent.

8. A method according to claim 1, wherein at least one disiloxane of formula I or a disiloxane of formula II is used as the silylating agent,

$$R_3Si\text{—}O\text{—}SiR_3 \quad (I)$$

$$R_3Si\text{—}N(H)\text{—}SiR_3 \quad (II)$$

in which the radicals independently of each other, identically or differently, each denote a hydrogen atom or a non-reactive organic linear branched cyclic saturated or unsaturated aromatic or heteroaromatic radical.

9. A method according to claim 8, characterised in that hexamethyl disiloxane is used as the silylating agent.

10. A method according to claim 1, wherein the means for surface-modification is generated shortly before and/or during surface modification.

11. The method of claim 10, in which the means for surface modification is generated by an acid.

12. A method according to claim 1, wherein the surface modification is accelerated by a catalyst.

13. A method according to claim 1, wherein in addition to the means for surface modification, at least one carrier gas or carrier gas stream is used in step b).

14. A method according to claim 1, wherein a part of water in the pores of the hydrogel reacts with the medium used for surface modification to produce a water insoluble compound.

15. A method according to claim 1, wherein the outer surface of the hydrogel is dried prior to surface modification.

16. A method according to claim 1, wherein prior to step c), the surface-modified gel is washed with a protic or aprotic solvent.

17. A method according to claim 1, wherein, prior to step c), the surface modified gel is washed with a silylating agent.

18. A method according to claim 1, wherein the surface modified gel is subcritically dried in step c).

19. A method according to claim 1, wherein the gel obtained in step a) is, prior to silylation, reacted with a solution of an orthosilicate capable of producing condensation and satisfying the formula $R^1_{4-n}Si(OR^2)_n$, in which n=2 to 4 and $R^1$ and $R^2$ are independently of each other hydrogen atoms linear or branched $C_1$–$C_6$-alkyl radicals, cyclohexyl radicals or phenyl radicals or is reacted with aqueous silicic acid aerogel solution.

20. A method according to claim 19 wherein the orthosilicate is an alkyl and/or aryl orthosilicate.

* * * * *